Sept. 4, 1951  S. BROOKES  2,567,051

SECATEUR

Filed April 10, 1950

INVENTOR
Samuel Brookes

By Watson, Cole, Grindle & Watson

Patented Sept. 4, 1951

2,567,051

UNITED STATES PATENT OFFICE 2,567,051

SECATEUR

Samuel Brookes, Sedgley, near Dudley, England, assignor to Walter Levison and Henry W. Littleales, London, England Application April 10, 1950, Serial No. 154,943
In Great Britain August 19, 1949

2 Claims. (Cl. 30—237)

This invention relates to secateurs particularly for use in pruning and has for an object to provide a disc-like cutter blade which is rotated and moved across another blade by pivotal movement between two hand grips. The disc may be rotatably mounted on an extension of one of said hand grips, and the other cutting blade may be formed on an extension of the other hand grip, and the means for effecting rotation of the cutting disc may comprise a projection thereon which engages guide means on the other extension. For example, the projection may be formed on that face of the cutting disc which is directed away from the part of the member on which it is rotatably mounted and said guide means may comprise a slot formed in a part of the other member which overlaps the cutting disc.

Preferably the slot is radially disposed with relation to the pivotal axis of these two members.

The said member may comprise hand grips extending on one side of the pivot axis and parts on the other side of the pivot axis carrying the cutting blades.

The cutting blade which co-operates with the disc may be curved along its length.

With the above arrangement the rotational movement of the cutting disc is necessarily less than one revolution and since it is desirable to make use of the whole circumference of the disc it is provided with a number of projections, any one of which may be brought into engagement with the guide slot by removing the disc and bringing a fresh projection into engagement. For this purpose the disc is rotatably mounted on a spindle which is detachably secured to the part which carries it.

The spindle may comprise a set-screw which engages a threaded hole in the part on which the disc is mounted, which set-screw is encircled by a sleeve of slightly greater axial length than the thickness of the cutting disc which is rotatably mounted on said sleeve and the set-screw is provided with a head of greater diameter than the sleeve and thus overlaps the disc and holds it in position. With this arrangement the sleeve is firmly gripped in position while the disc is freely mounted upon it. Preferably the part which carries the disc is provided with a recess in which the disc is mounted so that a wall of the recess encircles the greater part of the circumference of the disc thereby protecting it against damage but leaving a sufficient portion of the disc projecting for co-operation with the other cutting blade.

That face of the cutting disc which is arranged within the recess may be conical or spherical and the surface of the recess may be similarly shaped. The two aforesaid members may be pivotally mounted or secured together by a snap-headed rivet.

The aforesaid projections may each comprise a hardened steel peg fixed in a hole in the disc while the walls of the slot engaged by the peg are also hardened.

The usual form of compression spring is provided between the hand grips so that they are moved apart after a cutting action has been affected and a clip may be provided for holding the two hand grips together so that the cutting disc and other cutting blade are held together in an overlapping position whereby the whole of the circumference of the cutting disc is guarded against damage.

The following is a description of a pair of pruning secateurs according to the invention, reference being made to the accompanying drawings in which.

Figure 1:
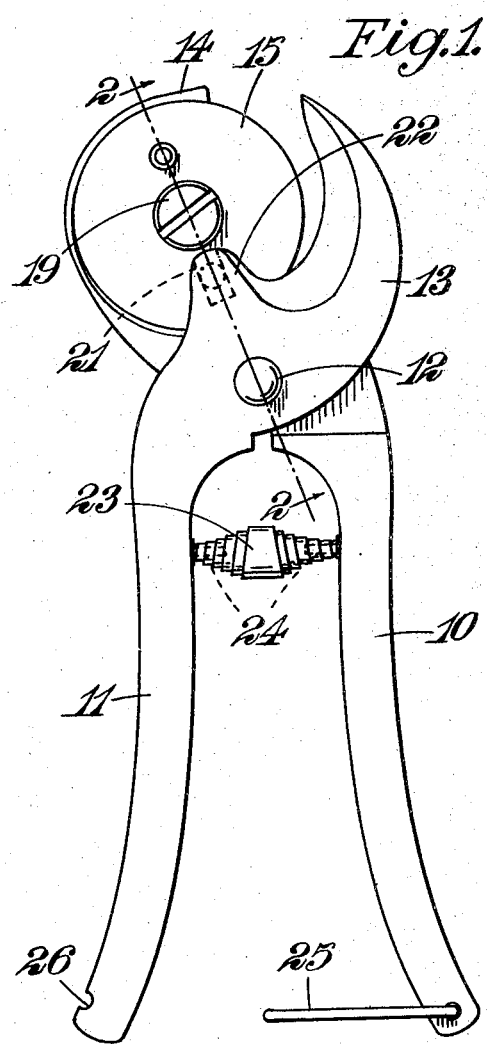
Figure 1 is a face view of the secateurs.
Figure 2:
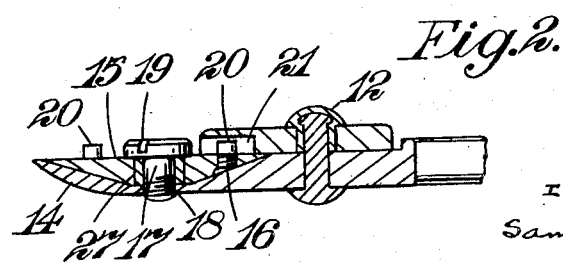
Fig. 2 is a section on the line 2—2 of Figure 1.

The secateurs comprise two hand grips 10 and 11 which are pivoted together by means of a snap-headed rivet 12. The hand grip 11 is provided with an extension in the form of a cutting blade 13, having a curved cutting edge while the other hand grip is provided with an extension 14 on which is rotatably mounted a cutting disc 15. As will be seen from Figure 2, the cutting disc is of conical shape, the conical face of which lies within a depression 16 formed in the extension 14 so that the flat face of the cutting disc lies flush with the face of the extension 14, and is thus largely protected from damage. The cutting disc is secured in position by the set-screw having a plain portion 17 encircled by a sleeve 27 around which the disc rotates and a threaded extremity 18 of which screw engages a threaded hole in the extension 14. The length of the sleeve is slightly greater than the thickness of the disc and the head 19 of the set screw bears on the end of the sleeve and overlies the disc so as to hold the disc in position. The disc is provided with two pegs 20 formed from hard steel which project from the flat face of the disc. Either one of the pegs is engageable with a radial slot 21 formed on the underside of a part 22 of the extension of the hand grip 11. The hand grips may be formed from mild steel and the sides of the slots are preferably case hardened. By these means rotational movement is imparted to the disc 15 when pivotal movement is applied to the hand grips and thus the cutting disc is swept across the cutting edge of the extension 13 and at the same time is rotated thereby enhancing the shearing effect. Should the cutting edge of the rotating disc become blunt, the disc may be removed by unscrewing the set screw 19 and after rotating the disc through 180° the other peg is brought into engagement with the radial slot 21, thus bringing a fresh portion of the disc into use.

The handgrips may be urged apart in known manner by a compression spring 23 which is located on pins 24 secured to the hand grip. When the secateurs are not in use the hand grips may be maintained together by a loop 25 pivotally secured to the hand grip 10 and engageable with the end of the hand grip 11 and retained therein against accidental displacement by engagement of the loop with a recess 26. In this position the cutting edge of the extension 13 overlaps the port cutting edge of the disc 15 projecting from the recess and the whole cutting edge is thus protected when the implement is not in use.

I claim:

1. Secateurs comprising two hand grips, a pivotal connection between the hand grips, extensions on the hand grips beyond the pivotal connection, one of which extensions comprises a cutting blade, and the other of which extensions is provided with a depression, a cutting disc rotatably mounted within the depression, and the outer face of which disc is flush with the face of the extension and which depression is so shaped as to permit a part of the cutting edge to project laterally from an opening in the recess, a projection on the outer face of the disc, guide means on the first said extension adapted to engage the projection and rotate the disc when the hand grips are pivotally moved.

2. Secateurs comprising two hand grips, a pivotal connection between the hand grips, extensions on the hand grips beyond the pivotal connection, one of which extensions comprises a cutting blade, a cutting disc having opposed flat and convex faces, a concavity on the other extension arranged to accommodate the convex face of the cutting disc and so as to locate the flat face flush with the face of the extension, a spindle within the concavity on which the cutting disc is rotatably mounted, a projection on the flat face of the cutting disc, guide means on the first said extension adapted to engage the projection and rotate the disc when the hand grips are pivotally moved.

SAMUEL BROOKES.

REFERENCES CITED

The following references are of record in the file of this patent:

UNITED STATES PATENTS

| Number | Name | Date |
|---|---|---|
| 393,197 | Woolley | Nov. 20, 1888 |

FOREIGN PATENTS

| Number | Country | Date |
|---|---|---|
| 141,174 | Great Britain | Apr. 15, 1920 |